(12) United States Patent  
Bang et al.

(10) Patent No.: US 9,423,641 B2
(45) Date of Patent: Aug. 23, 2016

(54) DISPLAY HAVING TOUCH SENSING FUNCTION

(71) Applicant: Samsung Display Co., Ltd., Yongin, Gyeonggi-Do (KR)

(72) Inventors: Jung Suk Bang, Guri-si (KR); Ki-Hun Jeong, Cheongan-si (KR); Dae Cheol Kim, Hwaseong-si (KR); Sung Ryul Kim, Asan-si (KR); Woong Kwon Kim, Cheonan-si (KR); Sung Jin Mun, Seoul (KR); Byeong Hoon Cho, Seoul (KR); Kun-Wook Han, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 177 days.

(21) Appl. No.: 13/967,239

(22) Filed: Aug. 14, 2013

(65) Prior Publication Data

US 2014/0184942 A1    Jul. 3, 2014

(30) Foreign Application Priority Data

Jan. 2, 2013 (KR) .................. 10-2013-0000138

(51) Int. Cl.
G02F 1/1333 (2006.01)
G02F 1/1335 (2006.01)
G06F 3/044 (2006.01)

(52) U.S. Cl.
CPC ...... *G02F 1/13338* (2013.01); *G02F 1/133512* (2013.01); *G02F 1/133514* (2013.01); *G06F 3/044* (2013.01); *G06F 2203/04103* (2013.01); *G06F 2203/04107* (2013.01)

(58) Field of Classification Search
None
See application file for complete search history.

(56) References Cited

U.S. PATENT DOCUMENTS

| 7,633,566 B2 * | 12/2009 | Utsunomiya et al. ........... 349/12 |
| 7,768,612 B2 * | 8/2010 | Hirota ........................... 349/141 |
| 2009/0185088 A1 * | 7/2009 | Shinohara ............. G06F 3/0412 349/12 |
| 2011/0090420 A1 * | 4/2011 | Kim et al. ...................... 349/59 |
| 2011/0205180 A1 | 8/2011 | Han et al. |
| 2012/0169985 A1 | 7/2012 | Kim et al. |

FOREIGN PATENT DOCUMENTS

| JP | 2008-171016 | 7/2008 |
| JP | 2010-250506 | 11/2010 |
| KR | 10-2005-0083433 | 8/2005 |
| KR | 10-2008-0058960 | 6/2008 |
| KR | 10-2011-0026764 | 3/2011 |
| KR | 10-2011-0082258 | 7/2011 |
| KR | 10-2012-0006964 | 1/2012 |
| KR | 10-2012-0013615 | 2/2012 |
| KR | 10-2012-0088010 | 8/2012 |

* cited by examiner

*Primary Examiner* — Dung Nguyen
*Assistant Examiner* — Shan Liu
(74) *Attorney, Agent, or Firm* — Innovation Counsel LLP (57) ABSTRACT

A panel for a display device is provided. The panel includes a first substrate, a touch sensing circuit formed on the first substrate, the touch sensing circuit including at least one sensing thin film transistor and a connection wire, and a shielding electrode formed covering at least a portion of the sensing thin film transistor and the connection wire.

16 Claims, 9 Drawing Sheets

DISPLAY HAVING TOUCH SENSING FUNCTION

CROSS-REFERENCE TO RELATED APPLICATION

This application claims priority to and the benefit of Korean Patent Application No. 10-2013-0000138 filed in the Korean Intellectual Property Office on Jan. 2, 2013, the entire contents of which are incorporated herein by reference.

BACKGROUND (a) Technical Field

This disclosure relates to a display device including a touch sensing circuit.

(b) Description of the Related Art

Electronic devices integrated with touch sensing function have proliferated in recent years. For example, desktop computers integrated with touch sensing function allow users to input commands by touching a monitor screen. Similarly, an increasing number of mobile devices (such as smart phones) are provided with touch sensing function.

To enable touch sensing function on a display device, a touch sensing panel (that is separately provided) may be attached to a display panel of the display device. Alternatively, a touch sensing circuit may be integrated into the display panel. Integrating the touch sensing circuit into the display panel can reduce the thickness (form-factor) of the display device and lower manufacturing costs. However, integrating the touch sensing circuit into the display panel may result in display-related issues. For example, a voltage provided to the touch sensing circuit (for sensing touch) may create a secondary electric field interfering with the alignment of liquid crystal molecules proximate to the touch sensing circuit. The interference may result in light leakage of the display device, thereby causing a contrast ratio of the display device to deteriorate.

SUMMARY

The present disclosure is directed to address at least the above problems relating to light leakage in display devices integrated with touch sensing function.

According to some embodiments of the present inventive concept, a panel for a display device is provided. The panel includes a first substrate, a touch sensing circuit formed on the first substrate, the touch sensing circuit including at least one sensing thin film transistor and a connection wire, and a shielding electrode formed covering at least a portion of the sensing thin film transistor and the connection wire.

In some embodiments, the panel may include a color filter and a black matrix each being disposed on the shielding electrode.

In some embodiments, the shielding electrode may be formed having a first matrix shape corresponding to a shape of the black matrix.

In some embodiments, a center portion of the shielding electrode may be removed to form an opening, and the opening is formed having a second matrix shape.

In some embodiments, a passivation layer may be formed between the touch sensing circuit and the shielding electrode, wherein the passivation layer has a trench formed around the touch sensing circuit, and the shielding electrode may be formed extending to a bottom of the trench.

In some embodiments, the trench may be formed by removing a portion of one or more insulating layers between the first substrate and the shielding electrode, and the shielding electrode may be formed in contact with the first substrate at the bottom of the trench.

In some embodiments, the passivation layer may include an inorganic insulating material.

In some embodiments, the passivation layer may include an organic insulating material.

In some embodiments, the passivation layer may include a first passivation layer formed of an inorganic insulating material and a second passivation layer formed of an organic insulating material.

In some embodiments, the touch sensing circuit may include a switching thin film transistor connected to the sensing thin film transistor, a sensing capacitor connected between an input terminal and an output terminal of the sensing thin film transistor, a sensing data line connected to the switching thin film transistor, and a sensing gate line for applying an on/off signal of the switching thin film transistor.

In some embodiments, a predetermined voltage may be applied to the shielding electrode.

According to some other embodiments of the present inventive concept, a liquid crystal display is provided. The liquid crystal display comprises a first display panel including a first substrate, a touch sensing circuit formed on the first substrate, the touch sensing circuit including at least one sensing thin film transistor and a connection wire, and a shielding electrode formed covering at least a portion of the sensing thin film transistor and the connection wire; a second display panel including a second substrate facing the first substrate, a pixel electrode and an opposing electrode formed on the second substrate, and a gate line and a data line formed on the second substrate; and a liquid crystal layer disposed between the first display panel and the second display panel.

In some embodiments, one of the pixel electrode and the opposing electrode may be formed as a plate electrode, and the other one of the pixel electrode and the opposing electrode may be formed as a linear electrode. The linear electrode may be formed overlapping with the plate electrode.

In some embodiments, the liquid crystal display may include a passivation layer formed between the touch sensing circuit and the shielding electrode, wherein the passivation layer has a trench formed around the touch sensing circuit, and the shielding electrode may be formed extending to a bottom of the trench.

In some embodiments, the trench may be formed by removing a portion of one or more insulating layers between the first substrate and the shielding electrode, and the shielding electrode may be formed in contact with the first substrate at the bottom of the trench.

In some embodiments, the passivation layer may include an inorganic insulating material.

In some embodiments, the passivation layer may include an organic insulating material.

In some embodiments, the passivation layer may include a first passivation layer formed of an inorganic insulating material and a second passivation layer formed of an organic insulating material.

In some embodiments, a predetermined voltage may be applied to the shielding electrode.

DETAILED DESCRIPTION OF THE EMBODIMENTS

The present inventive concept will be described more fully hereinafter with reference to the accompanying drawings, in which different embodiments of the inventive concept are shown. As those skilled in the art would realize, the described embodiments may be modified in various ways without departing from the spirit or scope of the present disclosure.

First, a display device according to an exemplary embodiment of the present inventive concept will be described with reference to FIG. 1.

Figure 1:
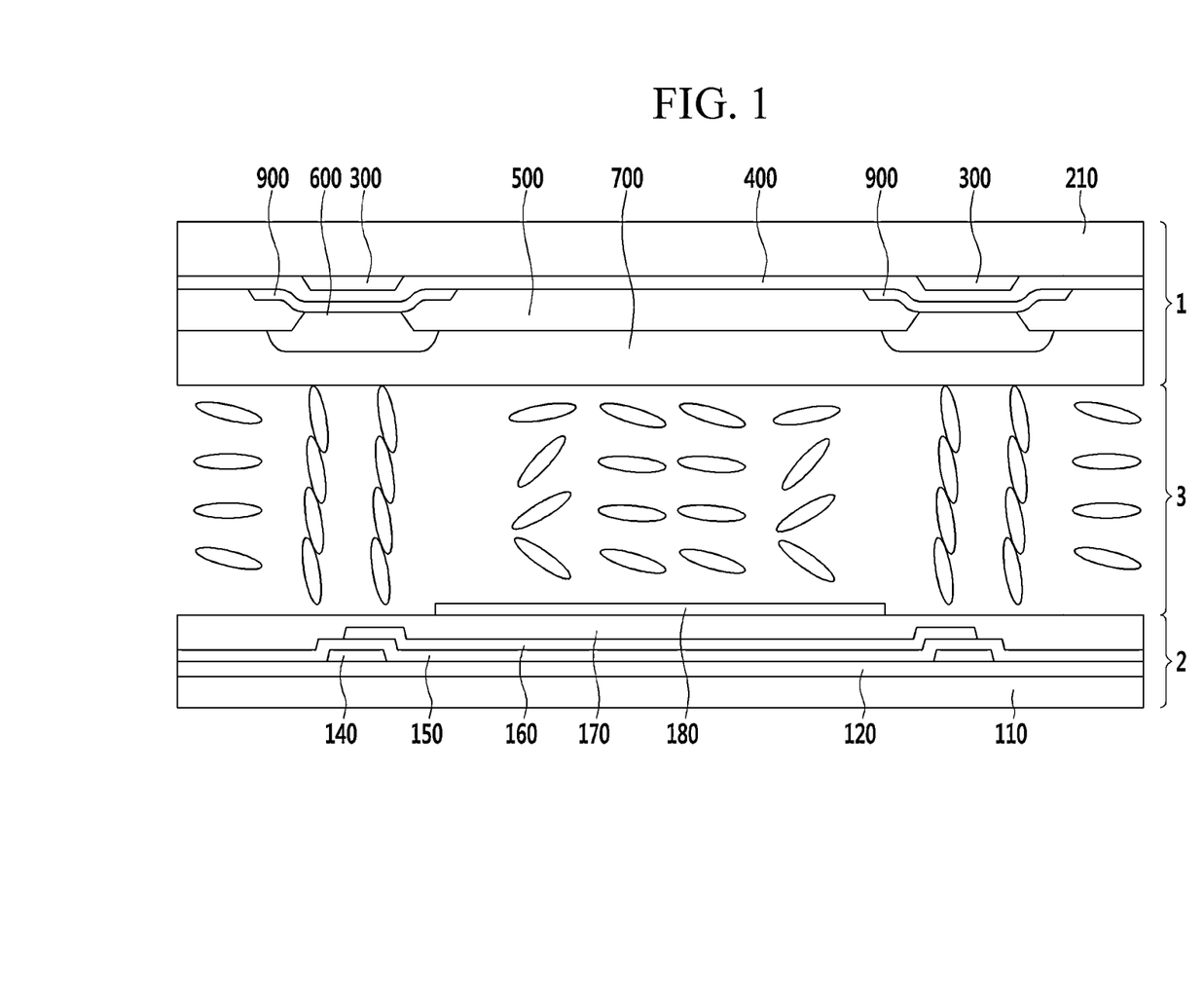
FIG. 1 is a cross-sectional view of a liquid crystal display according to an exemplary embodiment of the present inventive concept.

FIG. 1 is a cross-sectional view of a liquid crystal display according to an exemplary embodiment.

The liquid crystal display includes a liquid crystal driving panel 2 and a touch sensing panel 1, and a liquid crystal layer 3 interposed therebetween.

The liquid crystal driving panel 2 includes an insulation substrate 110 and various elements formed on the insulation substrate 110. As shown in FIG. 1, the liquid crystal driving panel 2 includes wires such as a gate line (not shown), data line 140, common electrode 160, and pixel electrode 180 formed on the insulation substrate 110. By applying a voltage to the common electrode 160 and pixel electrode 180, an electric field can be applied to the liquid crystal layer 3.

The liquid crystal driving panel 2 also includes a thin film transistor (not shown) for switching an image signal voltage applied to the pixel electrode 180.

The liquid crystal driving panel 2 further includes insulating layers for insulating the wires and electrodes. The insulating layers include a gate insulating layer 120, passivation layer 150, and interlayer insulating layer 170.

In some embodiments, at least one of the common electrode 160 and pixel electrode 180 is formed as a linear electrode. In some other embodiments, at least one of the common electrode 160 and pixel electrode 180 is formed as a plate electrode. The plate electrode may be disposed further away from the liquid crystal layer 3 than the linear electrode.

In the example of FIG. 1, the pixel electrode 180 is located closer to the liquid crystal layer 3 (relative to the common electrode 160), and may be formed having a linear shape. Thus, the pixel electrode may be formed as a linear electrode. The common electrode 160 is located further away from the liquid crystal layer 3 (relative to the pixel electrode 180), and may be formed having a plate-like shape. Thus, the common electrode may be formed as a plate electrode. Nevertheless, the inventive concept is not limited to the above-described embodiment. For example, in some other embodiments, the positions (relative to the liquid crystal layer 3) of the common electrode 160 and pixel electrode 180 may be switched. In those other embodiments, the common electrode 160 is located closer to the liquid crystal layer 3 (relative to the pixel electrode 180) and may be formed having a linear shape (i.e., formed as a linear electrode), and the pixel electrode 180 is located further away from the liquid crystal layer 3 (relative to the common electrode 160) and may be formed having a plate-like shape (i.e., formed as a plate electrode).

Referring to FIG. 1, the common electrode 160 and pixel electrode 180 are formed overlapping with each other. An electric field can be formed between the common electrode 160 and pixel electrode 180 to manipulate the alignment of liquid crystal molecules in the liquid crystal layer 3, so as to display an image.

As previously mentioned, the liquid crystal display of FIG. 1 includes a touch sensing panel 1. The touch sensing panel 1 includes an insulation substrate 210, a touch sensing circuit 300 formed on the insulation substrate 210, a passivation layer 400 formed on the touch sensing circuit 300, and a shielding electrode 900 formed on the passivation layer 400. The shielding electrode 900 is formed covering the touch sensing circuit 300 and a peripheral area of the touch sensing circuit 300.

The touch sensing panel 1 also includes a color filter 500 formed on the shielding electrode 900 and disposed in a region corresponding to the pixel electrode 180, a black matrix 600 formed on the color filter 500 and disposed in a region overlapping with the shielding electrode 900, and an overcoat 700 covering the black matrix 600 and color filter 500.

The touch sensing circuit 300 includes a sensing thin film transistor, a switching thin film transistor, a capacitor, and various wires. The touch sensing circuit 300 will be described in detail below with reference to FIG. 2.

Figure 2:
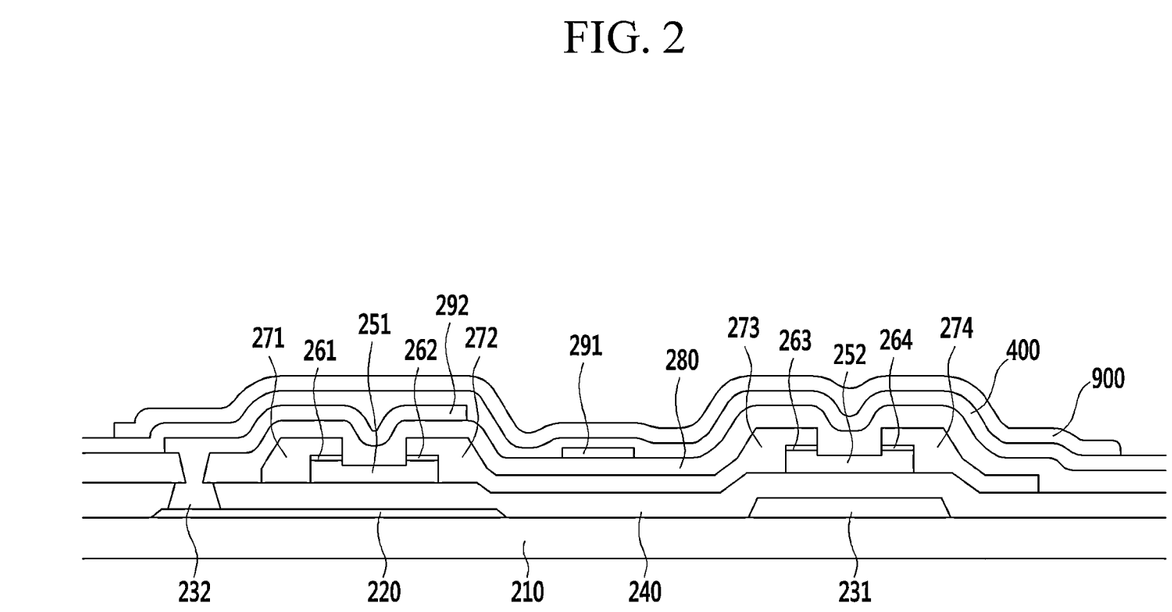
FIG. 2 is a cross-sectional view of a touch sensing panel in a liquid crystal display according to an exemplary embodiment.

FIG. 2 is a cross-sectional view of a touch sensing panel in a liquid crystal display according to an exemplary embodiment.

Referring to FIG. 2, an infrared filter 220 is formed on the insulation substrate 210, and bottom gate wire layers 231 and 232 are formed on the infrared filter 220. The infrared filter 220 may be formed of amorphous silicon germanium (a-SiGe). The bottom gate wire layers 231 and 232 may be formed having a triple layer structure (e.g., molybdenum/ aluminum/ molybdenum (Mo/Al/Mo)).

As shown in FIG. 2, the bottom gate wire layer 231 includes a portion 231 directly disposed on the insulation substrate 210, and the bottom gate wire layer 232 includes a portion 232 disposed on the infrared filter 220. A gate insulating layer 240 is formed on the bottom gate wire layers 231 and 232. A sensing semiconductor 251 and a switching semiconductor 252 are formed on the gate insulating layer 240. The sensing semiconductor 251 may be formed of amorphous silicon germanium (a-SiGe), and the switching semiconductor 252 may be formed of amorphous silicon (a-Si).

As shown in FIG. 2, ohmic contact layers 261, 262, 263, and 264 are formed on the sensing semiconductor 251 and switching semiconductor 252. A data wire (not shown) is formed on the contact layers 261, 262, 263, and 264. As shown further in FIG. 2, source electrodes 271 and 273 and drain electrodes 272 and 274 are formed on the contact layers 261, 263, 262, and 264, respectively.

A first passivation layer 280 is formed on the data wire. Referring to FIG. 2, a top gate electrode 292 of a sensing thin film transistor and an electrode 291 of a sensing capacitor are formed on the first passivation layer 280. The sensing capacitor is formed by overlapping the electrode 291 with a wire connecting the drain electrode 272 (of the sensing thin film transistor) and the source electrode 273 (of a switching thin film transistor). The data wire, top gate electrode 292, and electrode 291 may be formed having a triple layer structure (e.g., molybdenum/aluminum/molybdenum (Mo/Al/Mo)).

Referring to FIG. 2, the top gate electrode 292 of the sensing thin film transistor is connected to the infrared filter 220 by the bottom gate wire layer 232. As shown in FIG. 2, the bottom gate wire layer 232 is formed in a contact hole passing through the first passivation layer 280 and gate insulating layer 240 to the infrared filter 220. Accordingly, the infrared filter 220 has a bottom gate function of the sensing thin film transistor.

As shown in FIG. 2, a second passivation layer 400 is formed on the top gate electrode 292 and electrode 291, and a shielding electrode 900 is formed on the second passivation layer 400. The shielding electrode 900 may be formed covering a sensing gate line (not shown), sensing data line (not shown), switching thin film transistor, sensing capacitor, and sensing thin film transistor. The sensing gate line and sensing data line are connected to the sensing thin film transistor. The sensing capacitor transmits a signal to perform a sensing operation. The shielding electrode 900 may be formed of a conductive material (such as IZO (indium zinc oxide) or IZO (indium tin oxide)).

A voltage may be applied to the shielding electrode 900. The voltage applied to the shielding electrode 900 is not substantially different than the voltages applied to the common electrode 160 or pixel electrode 180 of the liquid crystal driving panel 2. In some embodiments, the voltage applied to the shielding electrode 900 lies within the range of voltages applied to the common electrode 160 or pixel electrode 180 of the liquid crystal driving panel 2. For example, if a voltage of 4.55 V is applied to the common electrode 160, and a black voltage of 4.75 V/5.21 V and a white voltage of 0.3 V/9.89 V are applied to the pixel electrode 180, a voltage of 2.55 V/6.55 V may be applied to the shielding electrode 900. In some particular embodiments, a voltage may not be applied to the shielding electrode 900 when the shielding electrode 900 is in a floated state.

Referring back to FIG. 1, a color filter 500, black matrix 600, and overcoat 700 are formed on the shielding electrode 900.

Next, the sensing function of the touch sensing panel 1 will be described with reference to FIGS. 1 and 2. When a user touches the insulation substrate 210 with a finger or a touch pen, infrared rays from the backlight of the display panel are reflected by the finger or touch pen and pass through the infrared filter 220. The infrared rays arrive incident to the surface of the semiconductor 251 of the sensing thin film transistor. When the semiconductor 251 of the sensing thin film transistor is irradiated with infrared rays, the sensing capacitor accumulates charges. Subsequently, when the switching thin film transistor is turned on through periodical scanning, the sensing capacitor outputs the charges as a sensing current.

During the sensing operation, different voltages are applied to the sensing gate line, data line, and thin film transistors (e.g., switching thin film transistor and sensing thin film transistor) in the touch sensing circuit 300. These voltages can form a secondary electric field between the pixel electrode 180 and common electrode 160, and the secondary electric field may interfere with the alignment of the liquid crystal. (See, e.g., FIG. 1). However, by forming the shielding electrode 900 to cover (shield) the touch sensing circuit 300, the effects of the secondary field from the touch sensing circuit 300 on the alignment of the liquid crystal can be minimized.

Figure 3:
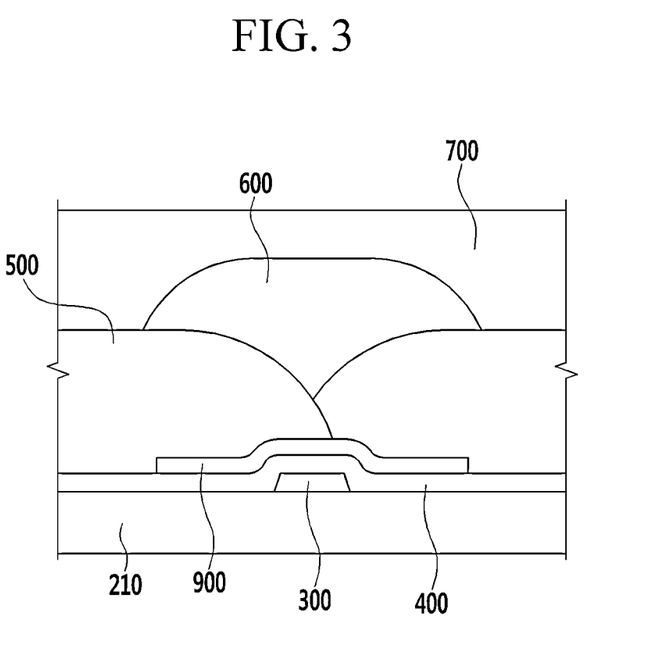
FIGS. 3 to 6 are cross-sectional views of a touch sensing panel in a liquid crystal display according to different embodiments.

FIG. 3 is a cross-sectional view of a touch sensing panel in a liquid crystal display according to an exemplary embodiment.

In FIG. 3, the neighboring color filters 500 have portions that overlap with each other. In contrast, the neighboring color filters 500 in FIG. 1 do not have any overlapping portions. In both FIGS. 1 and 3, the shielding electrode 900 is formed covering the touch sensing circuit 300, which reduces the effect of the secondary electric field (from the touch sensing circuit 300) on the alignment of the liquid crystal.

Figure 4:
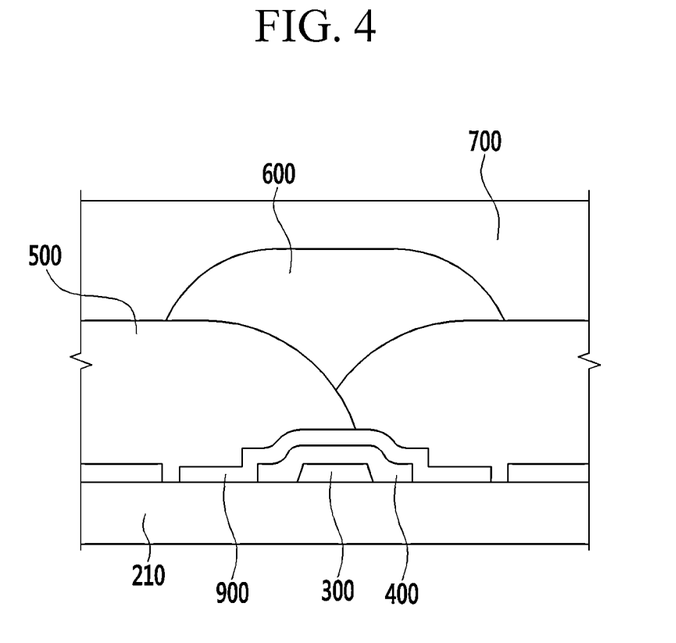

FIG. 4 is a cross-sectional view of a touch sensing panel in a liquid crystal display according to another exemplary embodiment.

In FIG. 4, a portion of the passivation layer 400 surrounding the touch sensing circuit 300 is removed to form a trench, and the shielding electrode 900 is formed extending to the bottom of the trench. Specifically, the trench may be formed by removing a portion of the insulating layers formed between the shielding electrode 900 and insulation substrate 210. For example, referring back to FIG. 2, a trench can be formed by removing a portion of the second passivation layer 400, first passivation layer 280, and gate insulating layer 240 surrounding the touch sensing circuit 300. The shielding electrode 900 may be formed in the trench in contact with the insulation substrate 210. When the shielding electrode 900 is formed extending to the bottom of the trench, the shielding electrode 900 encloses the touch sensing circuit 300 and can therefore provide a stronger shielding effect (compared to the structure of FIG. 3). In other words, the effect of the secondary electric field from the touch sensing circuit 300 on the alignment of the liquid crystal can be further minimized using the structure of FIG. 4.

Figure 5:
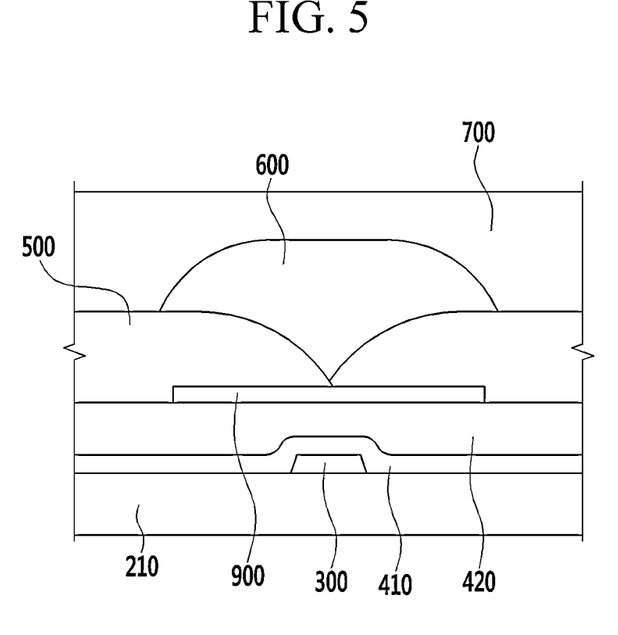

FIG. 5 is a cross-sectional view of a touch sensing panel in a liquid crystal display according to another exemplary embodiment.

In FIG. 5, a dual passivation layer (410 and 420) is formed on the insulation substrate 210. A first passivation layer 410 may be formed of an inorganic insulating material (such as silicon nitride or silicon oxide), and a second passivation layer 420 may be formed of an organic insulating material. The second passivation layer 420 may be used as a planarization layer. As shown in FIG. 5, the shielding electrode 900 is formed on the planar surface of the second passivation layer 420.

Figure 6:
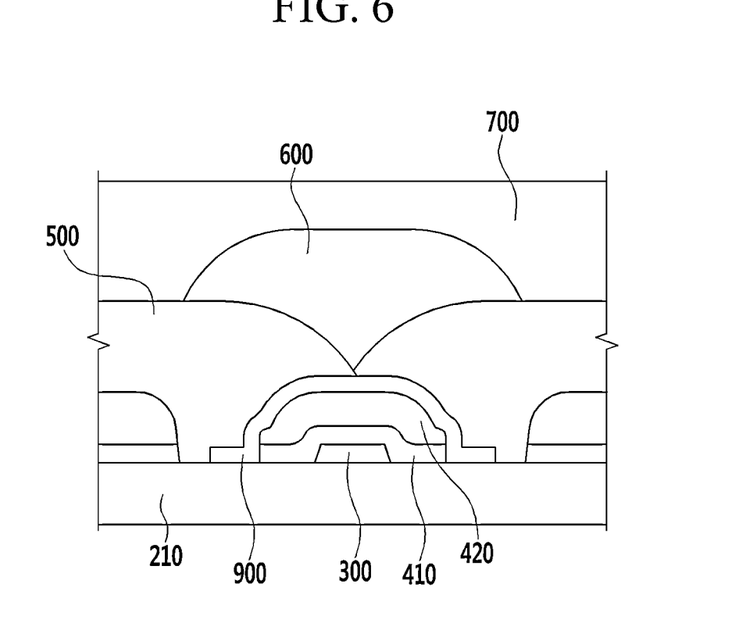

FIG. 6 is a cross-sectional view of a touch sensing panel in a liquid crystal display according to another exemplary embodiment.

FIG. 6 includes the dual passivation layer (410 and 420) of FIG. 5. Unlike FIG. 5, a portion of the passivation layers 410 and 420 surrounding the touch sensing circuit 300 is removed in FIG. 6 to form a trench. As shown in FIG. 6, the shielding electrode 900 is formed extending to the bottom of the trench. The trench may be formed by removing a portion of the insulating layers between the shielding electrode 900 and insulation substrate 210. As described above, since the shielding electrode 900 is formed extending to the bottom of the trench, the shielding electrode 900 encloses the touch sensing circuit 300, thereby enhancing the shielding effect. In other words, the effect of the secondary electric field from the touch sensing circuit 300 on the alignment of the liquid crystal can be further minimized using the structure of FIG. 6 (compared to the structure of FIG. 5).

Although FIGS. 5 and 6 show a dual passivation layer comprising the first passivation layer 410 and second passivation layer 420, in some embodiments the first passivation layer 410 may be omitted and only the second passivation layer 420 may be formed. As previously mentioned, the second passivation layer 420 may be formed of an organic material.

Figure 7:
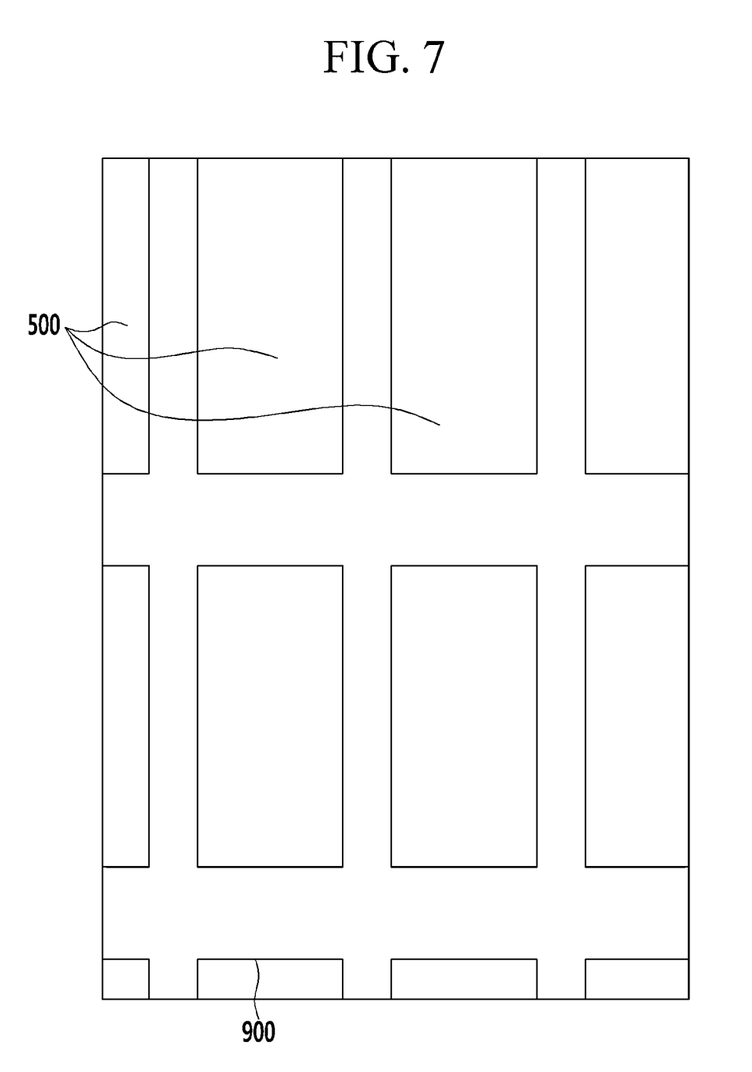
FIGS. 7 and 8 depict a layout of a touch sensing panel in a liquid crystal display according to different embodiments.

FIG. 7 is a layout of a touch sensing panel in a liquid crystal display according to an exemplary embodiment. Specifically, FIG. 7 shows a plane shape of a shielding electrode 900.

With reference to FIG. 7, the shielding electrode 900 is formed covering the touch sensing circuit 300. As described above, the touch sensing circuit 300 includes a sensing gate line and data line, sensing thin film transistor, and switching thin film transistor. As shown in FIG. 7, the shielding electrode 900 may be formed having a matrix shape. In some embodiments, the shielding electrode 900 may be formed overlapping with a black matrix. In some embodiments, a width of the shielding electrode 900 may be the same as a width of the black matrix. In other embodiments, a width of the shielding electrode 900 may be different from a width of the black matrix.

Figure 8:
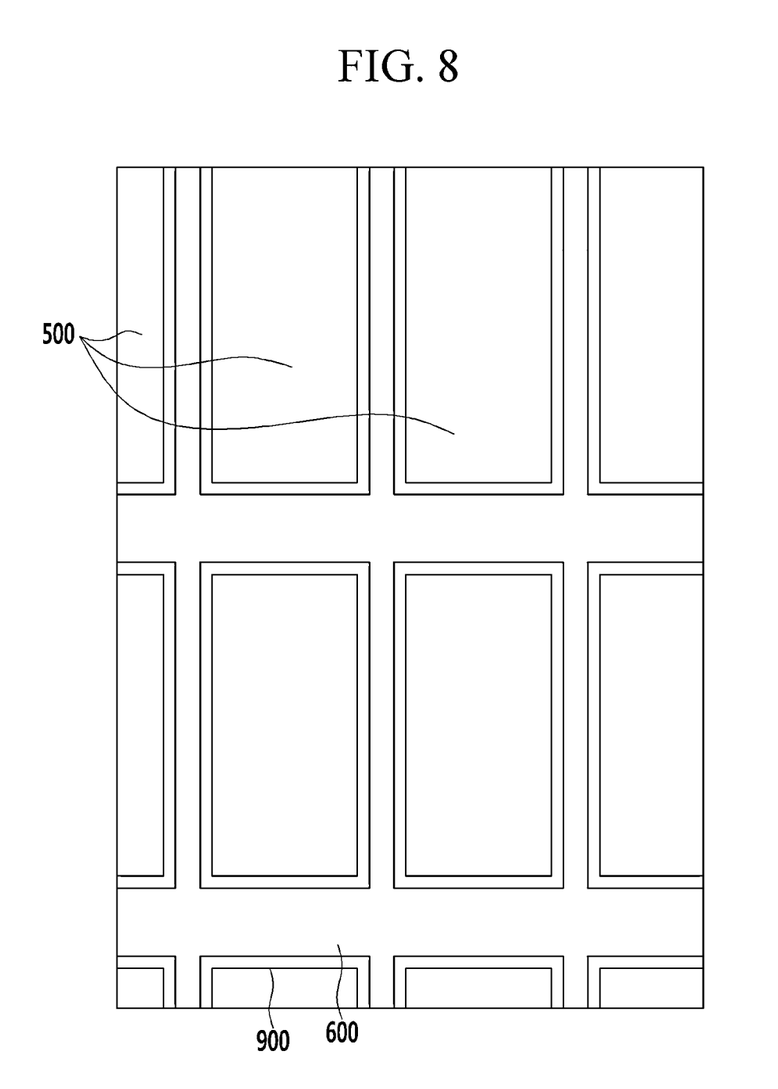

FIG. 8 is a layout of a touch sensing panel in a liquid crystal display according to another exemplary embodiment. Specifically, FIG. 8 shows another plane shape of a shielding electrode 900.

Referring to FIG. 8, a center portion of the shielding electrode 900 is removed to form an opening in the shielding electrode 900. A black matrix 600 is exposed through the opening in the shielding electrode 900. By forming the opening in the shielding electrode 900, the secondary electric field from the touch sensing circuit 300 can leak through the opening and affect the alignment of the liquid crystal. Nevertheless, if the black matrix 600 is formed at a position corresponding to the opening of the shielding electrode 900, any light leakage due to the misalignment of the liquid crystal (resulting from the secondary electric field) can be blocked by the black matrix 600. In other words, by overlapping the opening of the shielding electrode 900 with the black matrix 600, light leakage can be reduced by the light-blocking capability of the black matrix 600, even though the secondary electric field from the touch sensing circuit 300 may leak through the opening. In some embodiments, the black matrix 600 may be formed having a width that at least covers the opening of the shielding electrode 900. In some other embodiments, the black matrix 600 may be formed covering the entire shielding electrode 900.

In some embodiments, the electric field shielding effect of the shielding electrode 900 may be increased by reducing a width of the wiring included in the touch sensing circuit 300 (e.g., a width of the sensing gate line). For example, if a line width of the sensing gate line is 12 um, the shielding effect of the shielding electrode 900 can be increased by reducing the line width of the sensing gate line to 8 um or 5.5 um.

Figure 9:
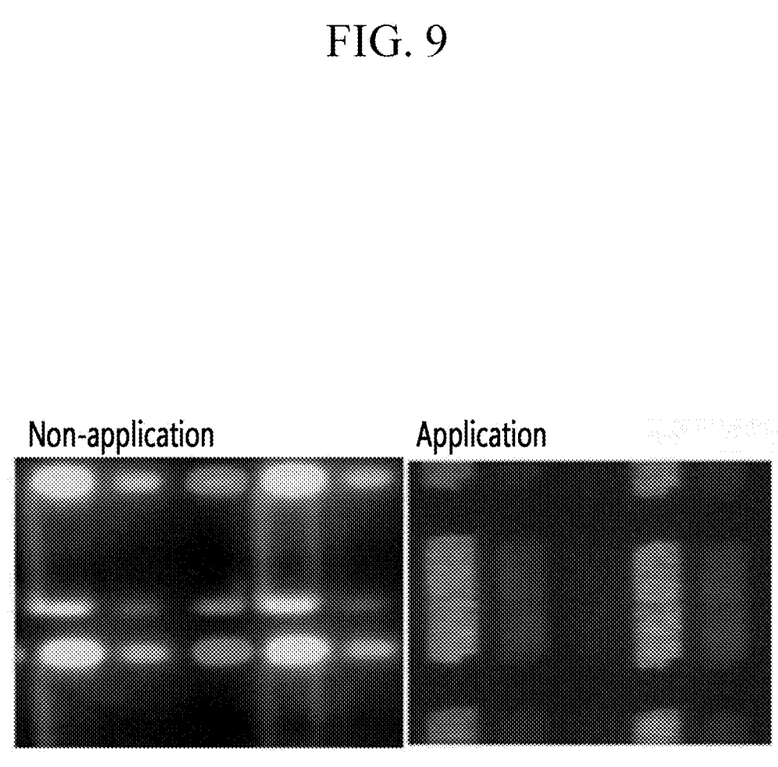
FIG. 9 illustrates the difference (reduction) in light leakage when an exemplary shielding electrode is used in a touch sensing panel.

FIG. 9 illustrates the difference (reduction) in light leakage when an exemplary shielding electrode is used in a touch sensing panel. Specifically, the left photo in FIG. 9 shows the degree of light leakage when a shielding electrode is not used, and the right photo in FIG. 9 shows the degree of light leakage when a shielding electrode (e.g., shielding electrode 900) is used.

Comparing the left and right photos in FIG. 9, it can be observed that light leakage is reduced when a shielding electrode (e.g., shielding electrode 900) is used in the touch sensing panel (e.g., touch sensing panel 1).

In some embodiments, the structure of the touch sensing panel 1 can be applied to an organic light emitting device or a plasma display device, in addition to the liquid crystal display described in this disclosure.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the disclosure.

What is claimed is:

1. A panel for a display device, comprising:
   a first substrate;
   a touch sensing circuit formed on the first substrate, the touch sensing circuit including at least one sensing thin film transistor and a connection wire;
   a shielding electrode formed on the touch sensing circuit and covering at least a portion of the sensing thin film transistor and the connection wire,
   a color filter and a black matrix disposed on the shielding electrode, and
   a passivation layer formed between the touch sensing circuit and the shielding electrode,
   wherein the passivation layer has a trench formed around the touch sensing circuit, and the shielding electrode is formed extending to a bottom of the trench.

2. The panel of claim 1, wherein the shielding electrode is formed having a first matrix shape corresponding to a shape of the black matrix.

3. The panel of claim 2, wherein a center portion of the shielding electrode is removed to form an opening, and the opening is formed having a second matrix shape.

4. The panel of claim 1, wherein
   the trench is formed by removing a portion of one or more insulating layers between the first substrate and the shielding electrode, and the shielding electrode is formed in contact with the first substrate at the bottom of the trench.

5. The panel of claim 1, wherein
   the passivation layer includes an inorganic insulating material.

6. The panel of claim 1, wherein
   the passivation layer includes an organic insulating material.

7. The panel of claim 1, wherein
   the passivation layer includes a first passivation layer formed of an inorganic insulating material and a second passivation layer formed of an organic insulating material.

8. The panel of claim 1, wherein the touch sensing circuit further comprises:
   a switching thin film transistor connected to the sensing thin film transistor;
   a sensing capacitor connected between an input terminal of the switching thin film transistor and an output terminal of the sensing thin film transistor; and
   a sensing gate line for applying an on/off signal of the switching thin film transistor.

9. The panel of claim 1, wherein
   a predetermined voltage is applied to the shielding electrode.

10. A liquid crystal display, comprising:
    a first display panel including a first substrate, the first display panel including:
       a touch sensing circuit formed on the first substrate, the touch sensing circuit including at least one sensing thin film transistor and a connection wire,
       a shielding electrode formed on the touch sensing circuit and covering at least a portion of the sensing thin film transistor and the connection wire,
       a color filter and a black matrix disposed on the shielding electrode, and
       a passivation layer formed between the touch sensing circuit and the shielding electrode, wherein the passivation layer has a trench formed around the touch sensing circuit, and the shielding electrode is formed extending to a bottom of the trench, and a second display panel including a second substrate facing the first substrate, the second display panel including a pixel electrode and an opposing electrode formed on the second substrate, wherein a liquid crystal layer is disposed between the first display panel and the second display panel.

11. The liquid crystal display of claim 10, wherein one of the pixel electrode and the opposing electrode is formed as a plate electrode, and the other one of the pixel electrode and the opposing electrode is formed as a linear electrode, wherein the linear electrode is formed overlapping with the plate electrode.

12. The liquid crystal display of claim 10, wherein the trench is formed by removing a portion of one or more insulating layers between the first substrate and the shielding electrode, and the shielding electrode is formed in contact with the first substrate at the bottom of the trench.

13. The liquid crystal display of claim 10, wherein the passivation layer includes an inorganic insulating material.

14. The liquid crystal display of claim 10, wherein the passivation layer includes an organic insulating material.

15. The liquid crystal display of claim 10, wherein the passivation layer includes a first passivation layer formed of an inorganic insulating material and a second passivation layer formed of an organic insulating material.

16. The liquid crystal display of claim 10, wherein a predetermined voltage is applied to the shielding electrode.

* * * * *